United States Patent
Dharmadhikari

(10) Patent No.: US 11,838,812 B1
(45) Date of Patent: Dec. 5, 2023

(54) SYSTEMS AND METHODS FOR NON-SERVING NETWORK HANDOVER INITIATION

(71) Applicant: CABLE TELEVISION LABORATORIES, INC., Louisville, CO (US)

(72) Inventor: Omkar Shripad Dharmadhikari, Lakewood, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

(21) Appl. No.: 17/239,441

(22) Filed: Apr. 23, 2021

Related U.S. Application Data

(60) Provisional application No. 63/014,258, filed on Apr. 23, 2020.

(51) Int. Cl.
  *H04W 36/00* (2009.01)
  *H04W 8/12* (2009.01)
  *H04W 8/04* (2009.01)
  *H04W 36/32* (2009.01)

(52) U.S. Cl.
  CPC ......... *H04W 36/0066* (2013.01); *H04W 8/04* (2013.01); *H04W 8/12* (2013.01); *H04W 36/0058* (2018.08); *H04W 36/32* (2013.01)

(58) Field of Classification Search
  CPC ............. H04W 36/00; H04W 36/0058; H04W 36/0066
  See application file for complete search history.

(56) References Cited

U.S. PATENT DOCUMENTS

| | | | | |
|---|---|---|---|---|
| 2009/0270099 A1* | 10/2009 | Gallagher | ............... | H04W 8/08 370/352 |
| 2009/0318141 A1* | 12/2009 | Benco | ................... | H04W 36/14 455/432.1 |
| 2013/0090124 A1* | 4/2013 | Panchal | ................ | H04W 24/02 455/452.1 |
| 2017/0048773 A1* | 2/2017 | Miao | .................... | H04B 1/3816 |

* cited by examiner

*Primary Examiner* — Sulaiman Nooristany
(74) *Attorney, Agent, or Firm* — Josh C. Snider

(57) ABSTRACT

A method is provided for initiating a handover, to a non-serving first wireless communication network, of a wireless electronic user device connected to a serving second wireless communication network to which the user device is not subscribed. The method includes a step of obtaining a device measurement report from the user device. The method further includes a step of analyzing, by a processor separate from the serving second wireless communication network, the obtained measurement report to detect visibility of the first wireless communication network in the measurement report. The method further includes a step of determining, from the detected visibility, that handover of the user device to the first wireless communication network is required. The method further includes a step of transmitting a handover command to the second wireless communication network.

17 Claims, 8 Drawing Sheets

SYSTEMS AND METHODS FOR NON-SERVING NETWORK HANDOVER INITIATION

RELATED APPLICATIONS

This application claims the benefit of and priority to U.S. Provisional Patent Application Ser. No. 63/014,258, filed Apr. 23, 2020, which is incorporated herein by reference in its entirety.

FIELD OF THE DISCLOSURE

This disclosure relates in general to the field of communications and, more particularly, initiation of device handover by a non-serving communication network.

BACKGROUND

Conventional electronic communication user devices, such as a wireless user equipment device (UE), typically communicate through a wireless communication network to which the user of the device is subscribed (referred to herein as the "home network") when the device is operating in communication range of a wireless communication node (e.g., a radio access network (RAN), cellular base station, evolved node B (eNB), gNB, etc.) of the home network. When moving outside of the operational range of a home network node, the UE will handover to a communication node of a non-home network (referred to herein as "visitor network" or "visited network"). Such internetwork handovers are defined by the 3rd Generation Partnership Project (3GPP) Technical Standard for roaming implementations.

Home and networks are typically owned and controlled by different operators (e.g., Multiple System Operators (MSOs), Mobile Network Operators (MNOs), other radio networks). Problems often arise for new cellular entrants and/or smaller operators who do not have an established cellular infrastructure or own/control significant portions of the wireless spectrum. Such newer/smaller operators are unable to provide their own end-to-end cellular service, and therefore require roaming agreements with other cellular operators to fall back on their network when the subscribers are out of coverage area of the home network provider.

For example, a typical home network provider would want to service its own subscriber UEs whenever the subscriber is within the home network coverage area. When a subscriber is on a visited network, the home network provider would want the roaming agreement to specify that the visited network will move the subscriber back on the home network when the subscriber moves back within range of a home network node. Conventionally, the home network must rely on the mobility parameters configured on the RAN of the roaming partner. Some roaming partners, however, are unwilling to make changes to or on their mobility parameters. An example of an internetwork communication system is described further below with respect to FIG. 1.

FIG. 1 depicts a conventional internetwork communication system 100. System 100 includes a home network 102 and a visitor network 104. In general, home network 102 includes core network portion 106 in communication with a node portion 108. Core network portion includes, for example, a mobile core, or an Evolved Packet Core (EPC). Node portion 108 includes, for example, a RAN, a cellular base station, a small cell, or an eNB. A user device 110 (e.g., a UE) connects with home network 102 through wireless communication with node portion 108 when user device 110 is within range of node portion 108. In this example, user device 110 is depicted as subscribed to home network 102 (or the operator thereof). Visitor network 104 similarly includes a core network portion 112 and a node portion 114, and user device 110 connects with visitor node portion 114 when user device 110 is within range of visitor node portion 114, and outside of communication range with home node portion 108.

In this example, home network 102 has a limited coverage area (e.g., an MSO or new entrant offering mobile services in a dense area) and visitor network 104 has a substantial coverage area that user device 110 is able to utilize as a fallback network outside the coverage area of home network 102. When user device 110 is outside of the coverage area of home network 102, and is connected to visitor network 104, the time spent by user device 110 on visitor network 104 represents a loss of revenue for the provider/operator of home network 102. This loss will occur, for example, when the coverage area of visitor network 104 overlaps with the coverage area of home network 102. In this case, user device 110 may move back into the coverage area of home network 102, but still be able to successfully operate on visitor network 104.

It would be beneficial for the home network provider to have user device 110 connect to home network 102 as soon as user device 110 enters back within the home network coverage area. Conventional techniques, however, require the home network provider to rely on the willingness of the visitor network provider to enable the handover. For example, if user device 110 is in idle mode, the inter-operator mobility of the device will depend on idle mode parameters and a high priority Public Land Mobile Network (PLMN) search is based on a periodic timer (e.g., defined in 3GPP). The minimum time periods of such timers are considered quite large, and few existing user devices will stay in idle mode for such durations, particularly with a number of background applications continuously running in the background of the device. If, on the other hand, user device 110 is in connected mode, user device 110 will not itself initiate handover unless relevant connected mode handover thresholds are met, such as in the case where the signal strength of visitor network 104 drops below a predetermined threshold, which is unlikely to occur where the coverage area of visitor network 104 overlaps home network 102.

Conventional service providers are thus realistically expected to optimize and configure these connected mode handover and idle mode reselection parameters to obtain a maximum benefit of visiting user devices on their network. Conventionally, the operator of home network 102 cannot control these parameters on visitor network 104. Accordingly, there is a desire in the industry for home network providers to have the capability of initiating handover back to the home network immediately after the user moves back inside the home network coverage, but without having to rely on the parameters set by the visited network.

SUMMARY

In an embodiment, a method is provided for initiating a handover, to a non-serving first wireless communication network, of a wireless electronic user device connected to a serving second wireless communication network to which the user device is not subscribed. The method includes a step of obtaining a device measurement report from the user device. The method further includes a step of analyzing, by a processor separate from the serving second wireless communication network, the obtained measurement report to detect visibility of the first wireless communication network in the measurement report. The method further includes a step of determining, from the detected visibility, that handover of the user device to the first wireless communication network is required. The method further includes a step of transmitting a handover command to the second wireless communication network.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1:
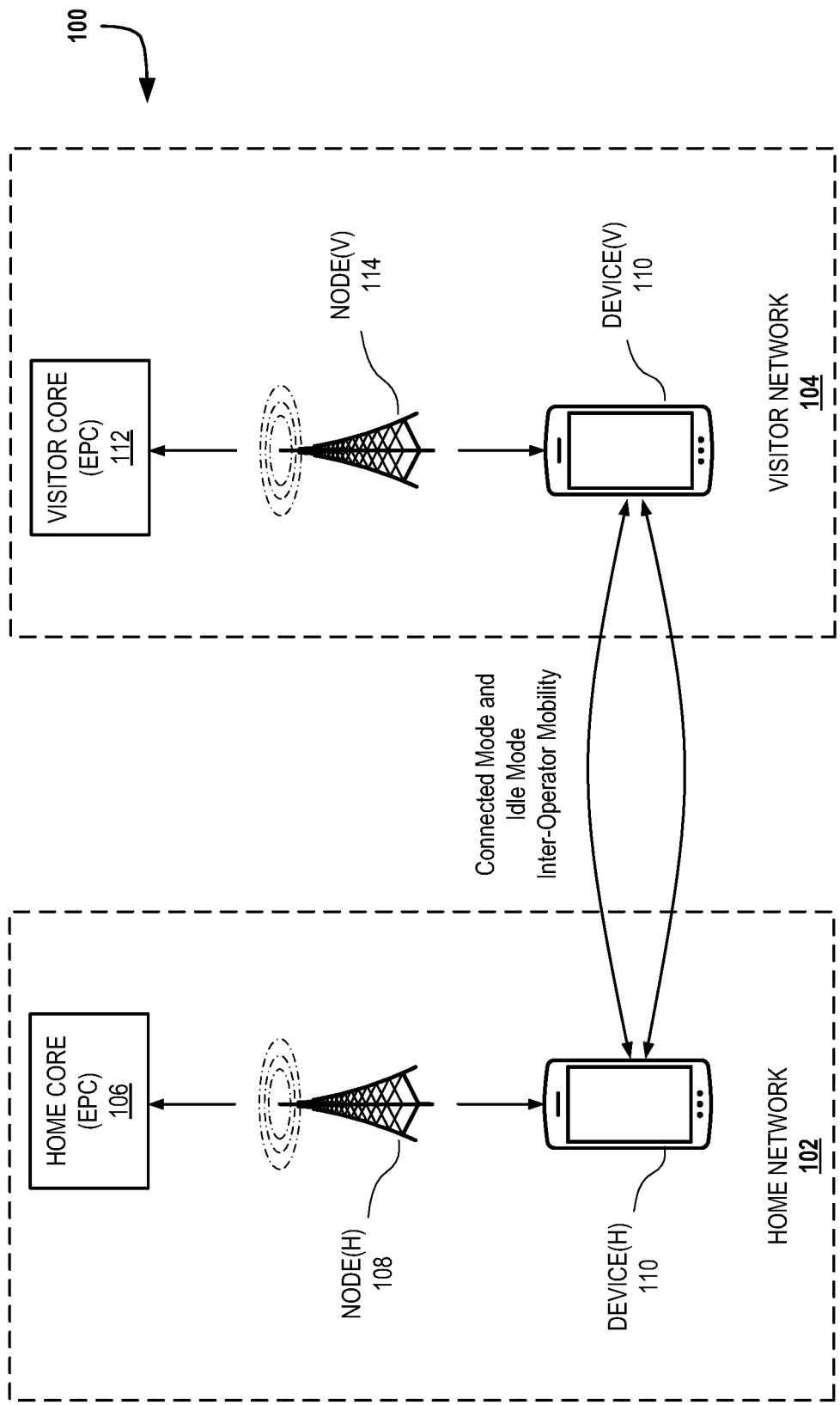
FIG. 1 depicts a conventional internetwork communication system.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc — read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As described herein, "user equipment," or UE, refers to an electronic device or system utilizing a wireless technology protocol, such as Long Term Evolution (LTE) or WiMAX (e.g., IEEE 802.16 protocols), and may include therein Wi-Fi capability to access and implement one or more existing IEEE 802.11 protocols. A UE may be fixed, mobile, or portable, and may include a transceiver or transmitter-and-receiver combination. A UE may have separate components, or may be integrated as a single device that includes a media access control (MAC) and physical layer (PHY) interface, both of which may be 802.11-conformant and/or 802.16-conformant to a wireless medium (WM).

According to the innovative systems and methods described herein, a home network provider/operator is advantageously provided with significant capability to initiate handover of wireless user devices back to the home network almost immediately after a user device comes back within range of the home network after roaming to a visited network. According to the present techniques, home network provider obtains much greater control of the data traffic of the subscriber device when the subscriber roams onto the visited network. According to the present systems and methods therefore, the home network provider is enabled to advantageously overcome disadvantageous handover parameters set by the visited networks outside of the control of the home network.

At present, the 3GPP Technical Specification defines several roaming implementations, such as the Home Routed (HR) implementation, and the Local Break Out (LBO) implementation. Exemplary architectures for these two particular roaming implementations are described further below with respect to FIGS. 2-3 and 4-5, respectively.

Figure 2:
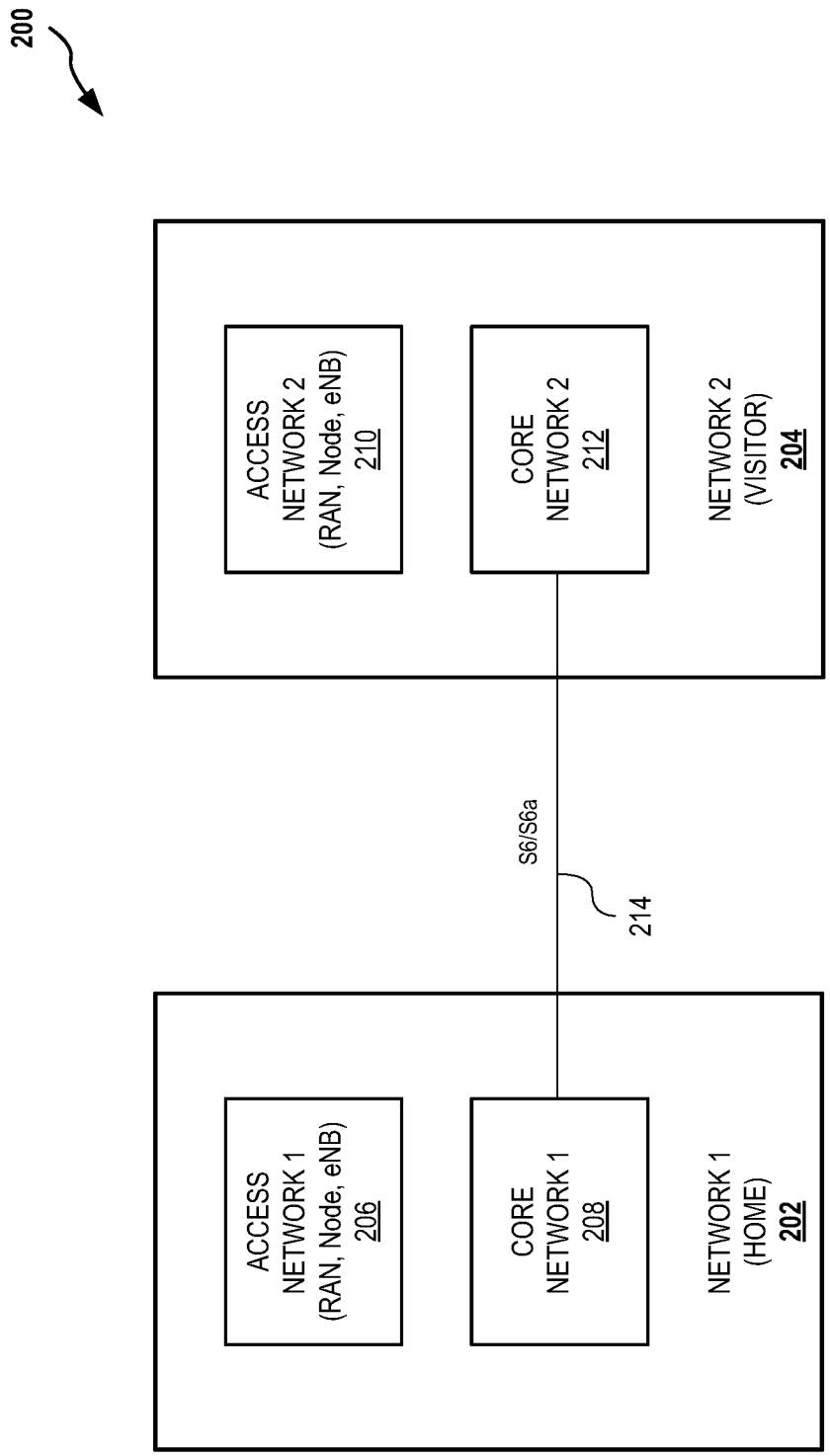
FIG. 2 is a schematic illustration depicting a local breakout cellular internetwork communication system, in accordance with an embodiment.

FIG. 2 is a schematic illustration depicting an LBO internetwork communication system 200. System 200 is similar to system 100, FIG. 1, and includes a home network 202 and a visitor network 204 with respect to the LBO paradigm. System 200 thus represents a simplified structural block diagram for inter-operator cellular roaming between networks 202, 204. Also similar to system 100, home network 202 of system 200 includes an access network portion 206 (e.g., RAN, node, eNB, etc.) and a core network portion 208 (e.g., mobile core, EPC, etc.), and visitor network 204 also includes an access network portion 210 and a core network portion 212. In exemplary operation, the home core network 208 and the visitor home network 212 implement handovers using a roaming interface 214, such as an S6/S6a interface.

Figure 3:
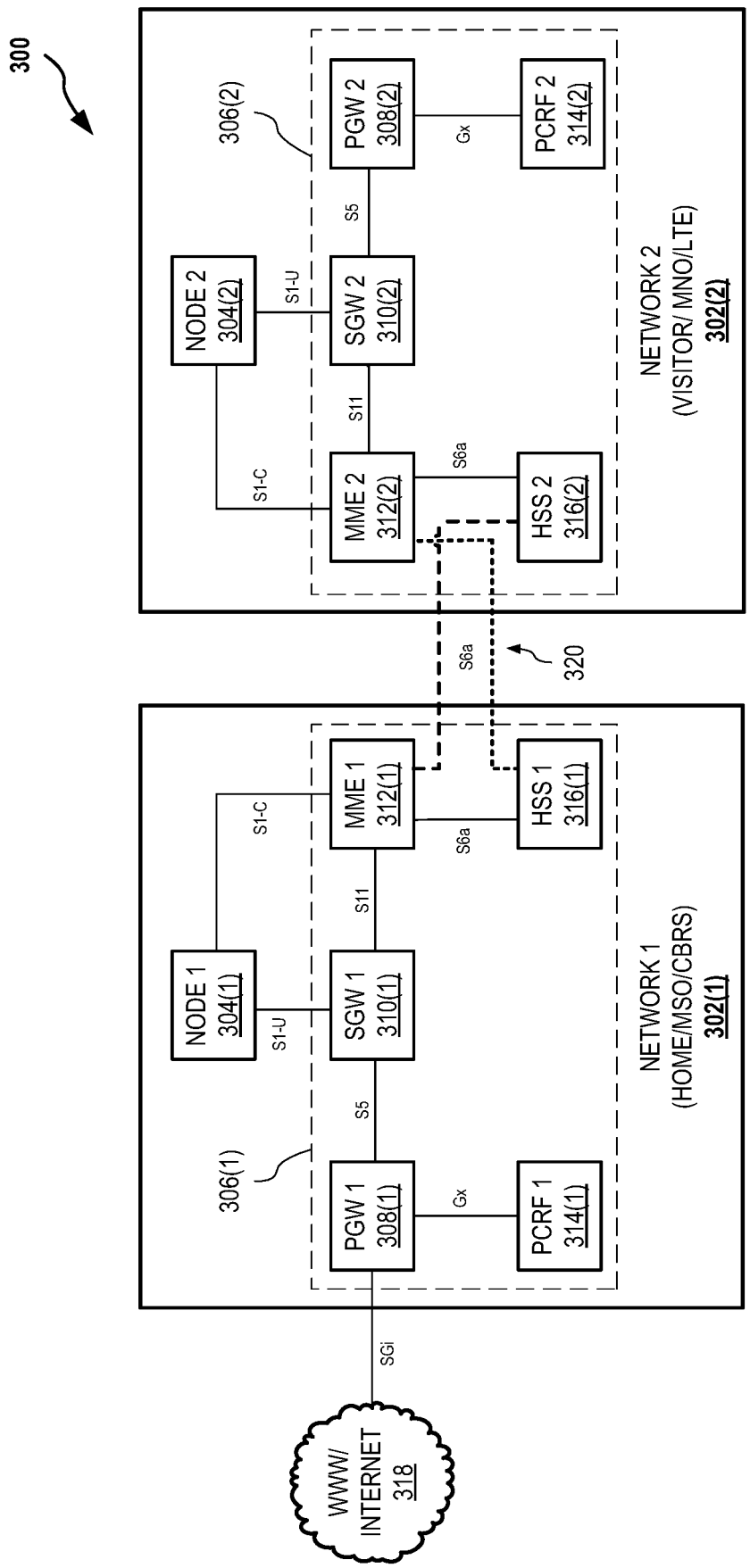
FIG. 3 is a schematic illustration depicting an exemplary architecture for the local breakout cellular internetwork communication system depicted in FIG. 2.

FIG. 3 is a schematic illustration depicting an exemplary architecture 300 for LBO cellular internetwork communication system 200, FIG. 2. That is, in the exemplary embodiment depicted in FIG. 3, architecture 300 represents a more detailed structural configuration that may be implemented for managing inter-operator cellular roaming between a first network 302(1) and a second network 302(2). In this example, first network 302(1) represents the home network of a subscriber device (not shown in FIG. 3), and second network 302(2) represents the visitor network to which the subscriber device may roam. First network 302(1) may, for example, represent a mobile cell of an MSO and/or CBRS, and second network 302(2) may represent the mobile cell of an MNO and/or a Long Term Evolution (LTE) provider. The person of ordinary skill the art will understand that these designations are provided by way of example, and are not intended to be limiting.

For ease of explanation, in the exemplary embodiment depicted in FIG. 3, first and second networks 302(1) and 302(2) are illustrated to each include several elements having substantially the same form and function as analogous elements in the other network. Accordingly, such analogous elements are labeled the same, and by the same respective numerical designation in this example, as well as in the examples described further below. The person of ordinary skill in the art though, will understand that either network may include additional or fewer components than the other network, or than what is illustrated in FIG. 3 without departing from the scope herein.

In an exemplary embodiment, both of first and second networks 302(1) and 302(2) include a communications node 304 that constitutes an access network portion of the network, and a core network portion 306. Similar to the examples described above, communications node 304 may include an eNB or base station that provides a RAN towards operating end user UEs. Core network portion 306 may include one or more of a Packet Data Network Gateway (PGW) 308, a Serving Gateway (SGW) 310, a Mobility Management Entity (MME) 312, a Policy Control and Charging Rules Function (PCRF) unit 314, and a Home Subscriber Server (HSS) 316.

In exemplary operation of architecture 300, node 304 (e.g., an eNB) communicates with MME 312 using the S1 protocol on an S1-MME interface (e.g., S1-C), and with SGW 310 using the GTP-U protocol on an S1-U interface. In this embodiment, MME 312 provides network functionality for the control plane of core network portion 306, including without limitation, session management, authentication, paging, mobility, and roaming. MME 312 thus controls and/or manages SGW 310 through an S11 interface, and communicates with HSS 316 through the S6 interface. SGW 310 functions to route user plane packets between an eNB (e.g., S1-U) and PGW 308 (e.g., utilizing an S5 or S8 interface), and handles UE handovers from neighboring nodes of visited networks (e.g., node 304(2) of second network 302(2)). PGW 308 represents a user plane component that forwards packets between its own network (e.g., an LTE network) and other packet networks 318 (e.g., using an SGi interface), such as the Internet or World Wide Web. PGW 308 may additionally perform charging and deep packet inspection (lawful interception) and/or Quality of Service (QoS) management, and HSS 316 is responsible for maintaining service subscription information of the user/UE.

In further exemplary operation of architecture 300, inter-operator roaming mobility between first and second networks 302(1), 302(2) is accomplished using an inter-network interface 320 (an S6a interface, in this example). More particularly, inter-network interface 320 enables interfacing between the MME of one network with the HSS of the other network (i.e., MME 312(1) with HSS 316(2), and MME 312(2) with HSS 316(1)). With regard to LTE access networks in particular, MME 312 is responsible for selecting SGW 310 for the UE at both its initial joining, and at the time of intra-network handover, and generally controls the mobility between the LTE access network and other access networks (e.g., 2G/3G access networks).

Conventional LBO-based implementations, such as those depicted with respect to system 200, FIG. 2, and architecture 300, FIG. 3, do not enable seamless handovers between networks, nor do they allow home network providers (e.g., of a first network 302(1)) to control the data traffic of their subscribers when the subscribers roam onto a neighboring visited network (e.g., second network 302(2)). As described further below in greater detail, these challenges are overcome according to the innovative techniques of the present embodiments.

Figure 4:
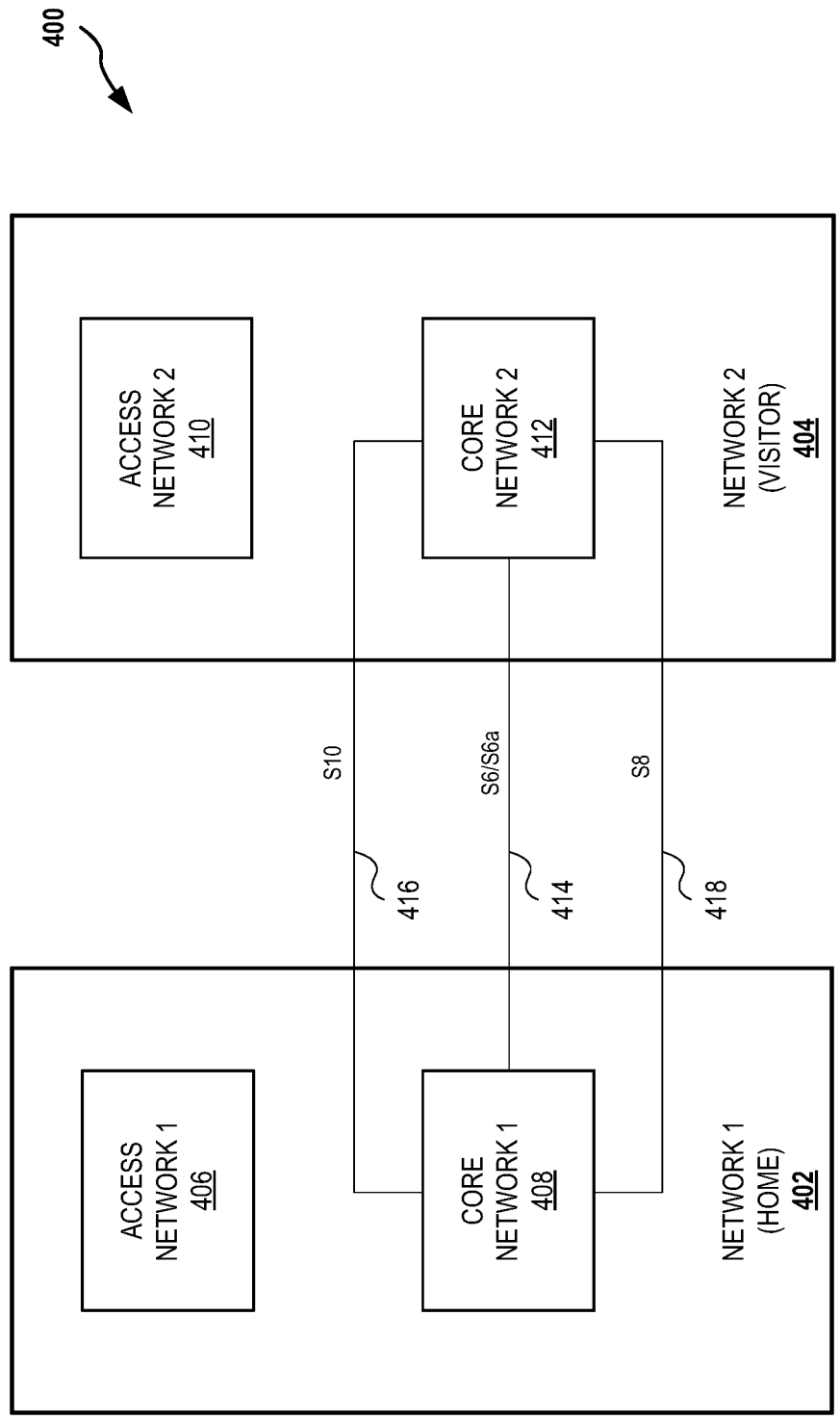
FIG. 4 is a schematic illustration depicting a home routed cellular internetwork communication system, in accordance with an embodiment.

FIG. 4 is a schematic illustration depicting an HR cellular internetwork communication system 400. HR system 400 is similar in many aspects to LBO system 200, FIG. 2, and is also represented as a simplified structural block diagram for inter-operator cellular roaming between a home network 402 and a visitor network 404, except with respect to the HR paradigm. That is, similar to LBO system 200, home network 402 of HR system 400 includes an access network portion 406 and a core network portion 408, visitor network 404 also includes an access network portion 410 and a core network portion 412, and a first roaming interface 414 (e.g., an S6/S6a interface, in this example) is provided between core network portions 408, 412.

Different though, from system LBO 200 though, HR system 400 additionally includes a second handover interface 416 (e.g., an s10 interface, in this example) a third handover interface 418 (e.g., an S8 interface, in this example) between core network portions 408, 412. An S10 interface (e.g., second handover interface 416), for example, is particularly useful for providing seamless handovers for UEs in connected mode and, in some conventional systems, providing some limited capability for the provider of home network 402 to control the data traffic of the UE when the subscriber device roams onto visitor network 404, but only with regard to policy, charging, and billing functionalities. This limited control capability does not occur, however, in the case where home network 402 and visitor network 404 do not share the same roaming interfaces, or where both networks are not configured with the same connected mode and idle mode mobility configurations. As explained further below, the present solutions overcome these challenges as well.

Figure 5:
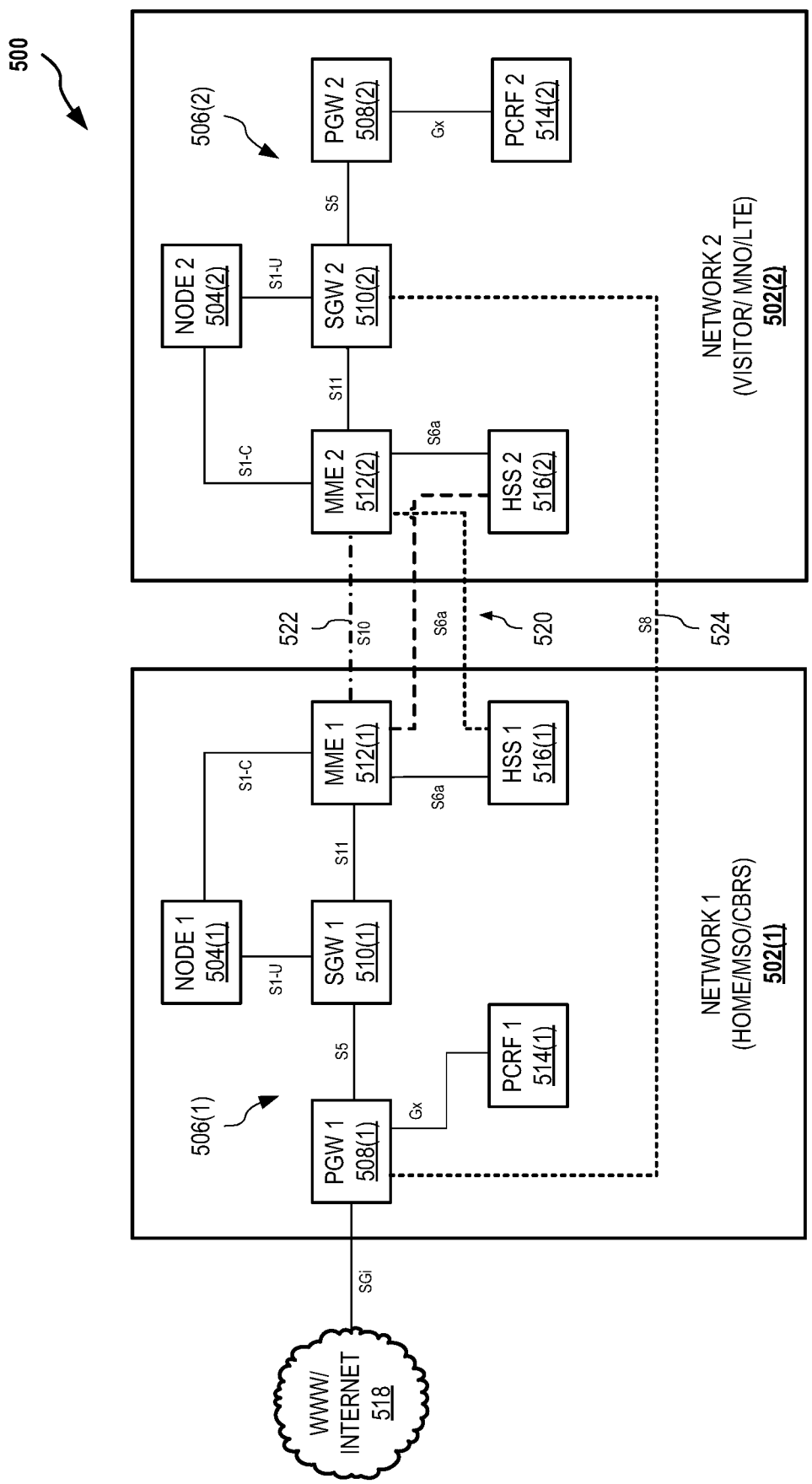
FIG. 5 is a schematic illustration depicting an exemplary architecture for the home routed cellular internetwork communication system depicted in FIG. 4.

FIG. 5 is a schematic illustration depicting an exemplary architecture 500 for HR cellular internetwork communication system 400, FIG. 4. Architecture 500 is similar in many aspects to architecture 300, FIG. 3, and thus similarly represents a more detailed structural configuration that may be implemented for managing inter-operator cellular roaming between a first network 502(1) and a second network 502(2), except with respect to the HR handover paradigm.

Also similar to architecture 300, first network 502(1) is illustrated in the embodiment depicted in FIG. 5 to represent the home network (e.g., MSO-owned CBRS network or managed DOCSIS small cell using backhaul to connect the small cell to core networks, the Internet, etc.) of a subscriber device (not shown in FIG. 5), and second network 502(2) represents the visitor network (e.g., MNO/mobile core, such as for 3G, 3GPP, 4G LTE, etc. networks) to which the subscriber device may roam. As with the embodiments described above, analogous elements among first and second networks 502(1), 502(2) are, for ease of explanation, provided with the same respective labels and numerical designations.

More particularly, in the exemplary embodiment depicted in FIG. 5, similar to architecture 300, both of first and second networks 502(1) and 502(2) include a communications node 504 as an access network portion/RAN thereof, and a core network portion 506 having one or more of a PGW 508, an SGW 510, an MME 512, a PCRF unit 514, and an HSS 516. PGW 508(1) of first network 502(1) similarly interfaces with other packet data networks 518 using an SGi interface, and a first roaming interface 520 (e.g., S6/S6a) genetics the respective MME 512 of one network with the opposite HSS 516 of the other network. That is, both MMES 512(1), 512(2) utilize an S6 interface with each HSS 516(1) and HSS 516(2).

Architecture 500 differs though, from architecture 300, in that architecture 500 further includes a second roaming interface 522 (e.g., an S10 interface, in this example) between MME 512(1) of first network 502(1) and MME 512(2) of second network 502(2), and a third roaming interface 524 (e.g., an S8 interface, in this example) between PGW 508(1) of first network 502(1) and SGW 510(2) of second network 502(2). As described further below, the present embodiments do not exclude these architectural examples for managing inter-operator roaming and mobility; however, the innovative systems and methods enable the home network to initiate handover of a returning subscriber device without requiring all of the shared interfaces and mobility configurations between the two networks.

Figure 6:
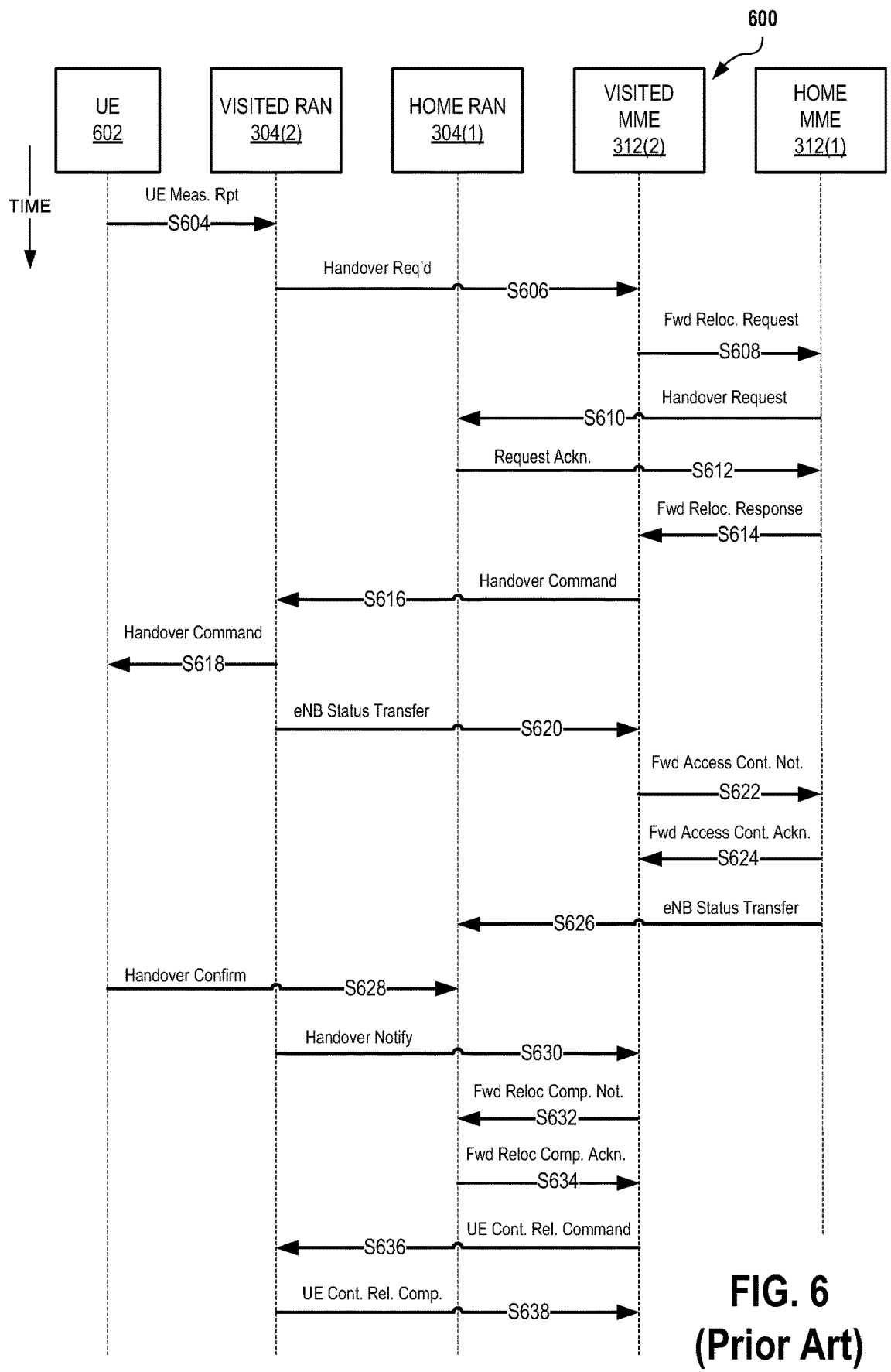
FIG. 6 is a sequence diagram depicting a conventional inter-operator handover process.

FIG. 6 is a sequence diagram depicting a conventional inter-operator handover process 600. Conventional process 600 may be implemented, for example with respect to a user device 602 (e.g., a UE) roaming from visitor network 302(2) to home network 302(1) of architecture 300, FIG. 3. In the embodiment depicted in FIG. 6, conventional process 600 is more particularly implemented for handover of UE 602 with respect to the second (visited) node/RAN 304(2), the first (home) node/RAN 304(1), the second/visited MME 312(2), and the first/home MME 312(1) of architecture 300.

In operation, process 600 begins at step S604, in which UE 602 provides a UE measurement report to visited node 304(2). In an embodiment of step S604, the UE measurement report enables tracking of different signal strength measurements, and thus provides a report to the respective communication node if certain conditions are met to assist the node in making handover decisions, and particularly in the case of LTE or 4G LTE roaming. In step S606, visited node 304(2) determines, from the received UE measurement report, that the handover conditions are met, and communicates to visited node 312(2) that handover of UE 602 is required. In step S608, visited MME 312(2) forwards a relocation request to home MME 312(1).

In step S610, home MME 312(1) communicates a handover request to home node 304(1) and, in step S612, home node 304(1) communicates a handover request acknowledgment to home MME 312(1). In step S614, home MME 312(1) forwards a relocation response to visited MME 312(2). In step S616, visited MME 312(2) sends a handover command to visited node 304(2) and, in step S618, visited node 304(2) transmits the handover command to UE 602.

In step S620, visited node 304(2) communicates a node status transfer to visited MME 312(2). In step S622, visited MME 312(2) forwards an access context notification to home MME 312(1) and, in step S624, home MME 312(1) forwards an access context acknowledgment back to visited MME 312(2). In step S626, home MME 312(1) then communicates the node status transfer to home node 304(1).

In step S628, UE 602 confirms the handover with home node 304(1). In step S630, visited node 304(2) notifies visited MME 312(2) of the handover and, in step S632, visited MME 312(2) forwards a notification to home node 304(1) that the relocation of UE 602 has been completed. In step S634, home node 304(1) forwards and acknowledgment of the relocation completion notification back to visited MME 312(2). In step S636, visited MME 312(2) transmits a UE context release command to visited node 304(2) and, in step S638, visited node 304(2) responds to visited MME 312(2) that the UE context release is complete.

As indicated by the call flow of conventional process 600, the visitor network (e.g., visitor network 302(2)) retains complete handover control of UE 602, and the home network (e.g., home network 302(1)) only passively responds to relocation requests forwarded from the visitor network (e.g., step S608). As described further below with respect to FIGS. 7 and 8 though, the present systems and methods enable a home network to initiate handover for its own subscriber devices without first requiring a relocation request from the visitor network, or a determination by the visitor network that handover conditions established by the visitor network have been met.

Figure 7:
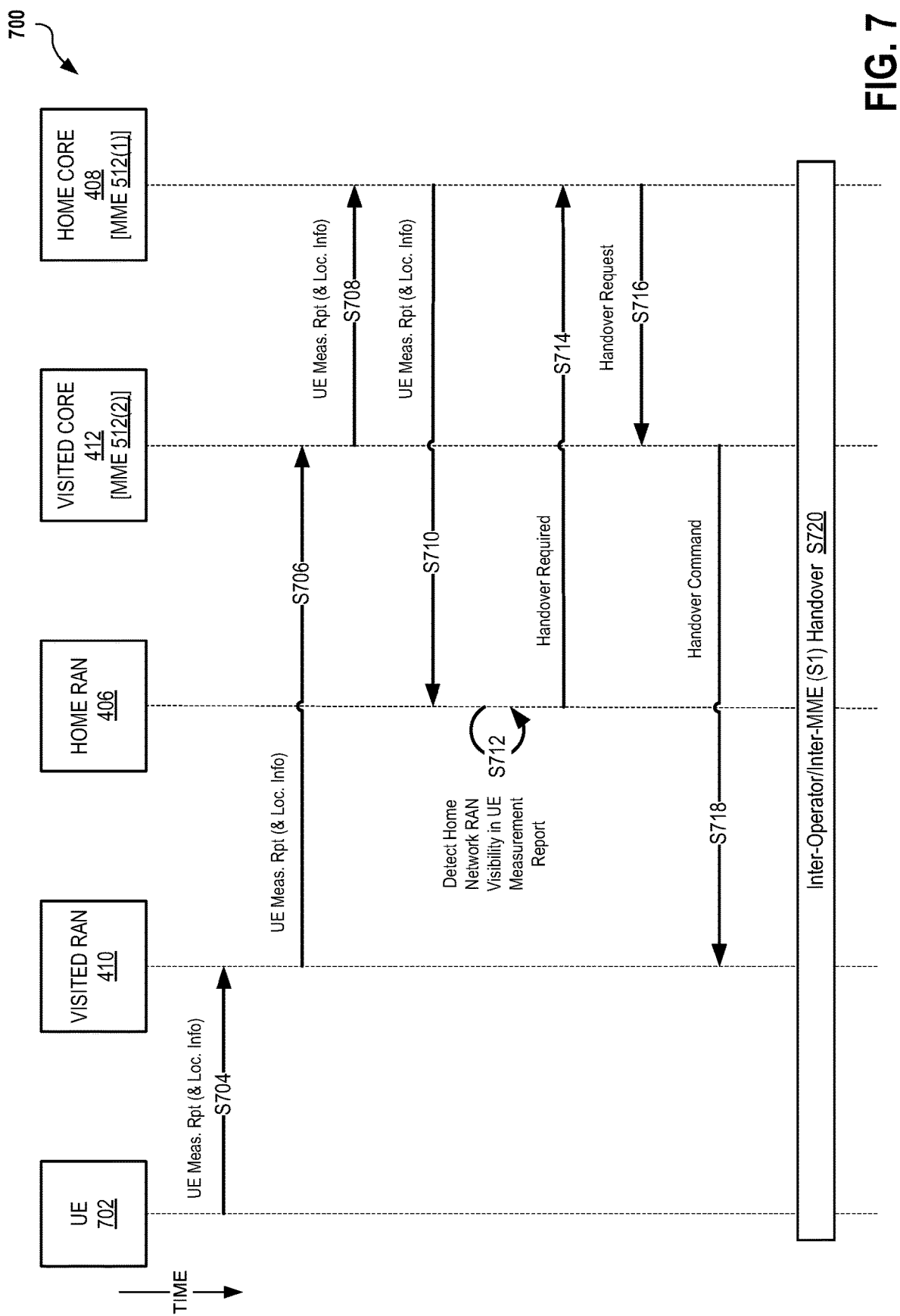
FIG. 7 is a sequence diagram depicting an exemplary home network-initiated inter-operator handover process, in accordance with an embodiment.

FIG. 7 is a sequence diagram depicting an exemplary home network-initiated inter-operator handover process 700. In the exemplary embodiment depicted in FIG. 7, for ease of explanation, process 700 is illustrated with respect to a UE 702 subscribed to home network 402, FIG. 4, but operating (i.e., at the start of process 700) on visitor network 404. Process 700 may be more particularly implemented utilizing visited node (RAN) 410, home node (RAN) 406, visited core 412, and home core 408 of system 400. In an exemplary embodiment, visited core 412 may include MME 512(2), FIG. 5, and home core 408 may include MME 512(1). In some embodiments, one or both of MME 512(1) and MME 512(2) may further include, or cooperate with, an Access and Mobility Management Function (AMF, not separately shown), which may perform some of the mobility management role the respective MME, such as in a 4G network.

When implemented, process 700 may execute the following steps, which are not necessarily required to be in the order listed, except where so clearly designated as being dependent on a prior step. In step S704, UE 702 transmits a UE measurement report to visited node 410. In an exemplary embodiment of step S704, the UE measurement report includes location information regarding the UE at the time of the report. In step S706, visited ran 410 forwards the UE measurement report to visited core 412. In step S708, home core 408 obtains the forwarded UE measurement report from visited core 412 (e.g., utilizing one or more of core-to-core roaming interfaces 414, 416, 418) and, in step S710, forwards the obtained UE measurement report, including any location information obtained therein or therewith, to home node 406.

In step S712, home node 406 analyzes the UE measurement report to detect when home node 406 is visible in the UE measurement report. In an exemplary embodiment of step S712, visibility of home node 406 is determined upon detection of the cell ID of home node 406 in the measurement report. In further operation of step S712, upon detection of home node visibility, home node 406 further determines that a forced handover of UE 702 is to be initiated. In some embodiments, the determination to initiate forced handover may be based, at least in part, on the location information that may be included in or with the UE measurement report.

In step S714, home node 406 communicates to home core 408 that handover is required. In step S716, home core 408 communicates a handover request to visited core 412, which prompts, in step S718, visited core 412 to communicate a handover command to visited node 410. In step S720, handover of UE 702 may then proceed according to conventional roaming protocols.

Thus, according to the innovative techniques of process 700, a home network is enabled to utilize available UE measurement reports to initiate forced handovers as soon as the communication node of the home network is visible to the subscriber UE. The home network is therefore freed from reliance on the visitor network to determine when to release a subscriber device of the home network based on the mobility parameter configurations of the visited network.

In the exemplary embodiment described above, process 700 is illustrated to obtain the UE measurement report indirectly, through core-to-core communications or interfaces with the visited network. In some cases though, the communications node/eNB of the home network may obtain the UE measurement report directly from the UE, which is more likely to occur, for example, in the case where the UE is a dual-SIM device. A technique for a dual-SIM UE is described further below with respect to FIG. 8.

Figure 8:
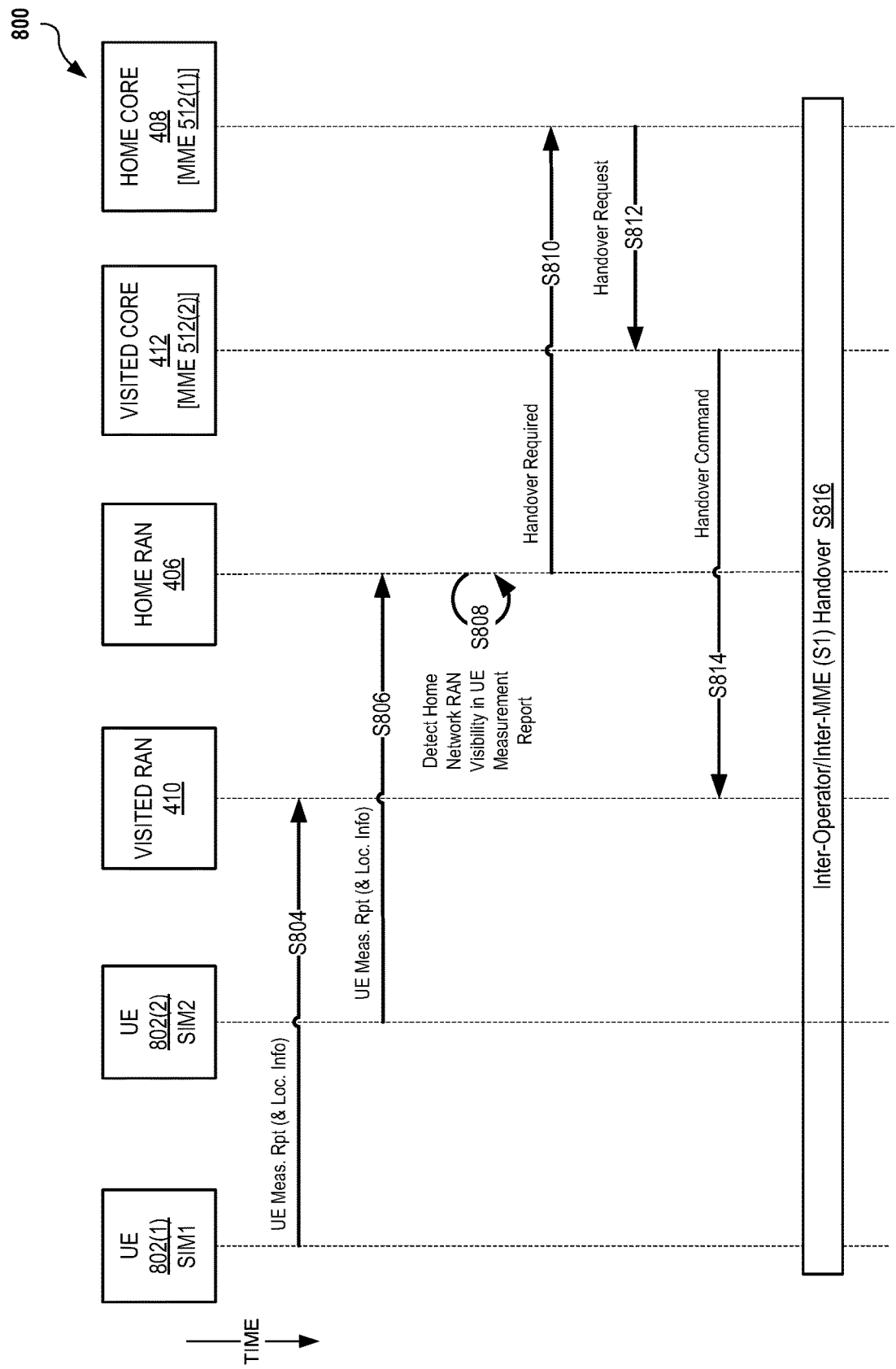
FIG. 8 is a sequence diagram depicting an alternative home network-initiated inter-operator handover process, in accordance with an embodiment.

FIG. 8 is a sequence diagram depicting an alternative home network-initiated inter-operator handover process 800. In the exemplary embodiment depicted in FIG. 8, process 800 is architecturally similar to process 700, and thus is also illustrated as operating with respect to the same visited node 410, home node 406, visited core 412, and home core 408, as well as respective MMEs and/or AMFs thereof, of system 400, FIG. 4.

Process 800 differs though, from process 700, in that process 800 is further implemented with respect to a UE 802 being a dual-SIM device (i.e., SIM1 802(1) and SIM2 802(2) representing separate subscriber identification modules of the same UE 802), such as a Dual SIM Dual Standby (DSDS) or a Dual SIM Dual Active (DSDA) device. For example, in some cases, a dual-SIM device might be outside of the coverage of the network associated with one of the SIMS, but not the other SIM. Process 800 thus contemplates the scenario where the two SIMs 802(1-2) of dual-SIM UE are simultaneously connected with both of home network 402 and visitor network 404, respectively.

When implemented, process 800 may execute the following steps, which are not necessarily required to be in the order listed, except where so clearly designated as being dependent on a prior step. In this example, at the start of process 800, SIMI 802(1) is connected with visitor network 404, and SIM2 802(2) is connected with home network 402. Considering these initial conditions, in step S804, SIM1 802(1) transmits a UE measurement report, which may include location information, to visited node 410. In step S806, SIM2 802(2) transmits the UE measurement report/location information to home node 406. In some embodiments, steps S804 and S806 may occur substantially simultaneously.

In step S808, home node 406 analyzes the UE measurement report received directly from SIM2 802(2), and detects from the UE measurement report/location data that home node 406 is visible to SIM1 802(1). In an exemplary embodiment of step S808, the visibility detection is performed in a manner similar to that described above with respect to step S712, FIG. 7. In further operation of step S808, home node 406 further determines that a forced handover of SIM1 802(1) is to be initiated. In step S810, home node 406 communicates the required handover to home core 408 and, in step S812, home core 408 communicates a handover request to visited core 412. In step S814, visited core 412 communicates a handover command to visited node 410. In step S816, handover of SIM1 802(1) may then proceed according to conventional roaming protocols.

The person of ordinary skill in the art will understand that the respective processes 700 and 800 are provided by way of example, and are not intended to be limiting. That is, the particular exemplary steps of these respective processes are not exclusive of one another. For example, in addition to, or alternatively from, a home network-initiated handover based on the direct UE measurement report to home node 406 in step S806, home network 402 is further enabled to initiate a forced handover of either SIM based on a UE measurement report indirectly obtained from visited network 404 after step S804, and in a manner similar to that described above with respect to process 700. Additionally, as described above, a process similar to that described with respect to steps S808 through S814 may be initiated by home network 402 even in the case of a single-SIM UE that receives a UE measurement report directly from the single-SIM UE.

The present systems and methods thus significantly improve, in comparison with conventional 3GPP-based S1 handover techniques, the control and capabilities of the home network for its subscriber devices roaming onto neighboring visitor networks. The present embodiments are therefore particularly useful for new and emerging technologies beyond 3GPP, such as 4G, 4G LTE, 5G, 5G-NR, and 6G.

The present embodiments further improve the efficiency of handovers with respect to networks other than the home network of the subscriber UE. For example, according to the innovative techniques herein, in the case where the UE is connected to a roaming network not having a higher priority PLMN, the UE measurement report may be obtained by eNBs of other, non-serving networks which may have higher priority PLMNs than the serving roaming network. In this scenario, either the serving eNB or the higher-priority non-serving eNBs may initiate or request handovers based on, for example, the highest priority PLMN present in UE the measurement report, which could greatly improve efficiency of handovers between a plurality of visitor roaming networks.

In some embodiments, such as in the case of multiple eNB candidates having the highest priority PLMN in UE measurement report, the UE may be itself configured to send the measurement report to the neighboring eNB having the highest relative signal strength, while still also continuing to sending the UE measurement reports to the serving eNB. In this manner, the UE itself may be optimally configured to analyze the UE measurement report and initiate the handover to its own home network (i.e., when the home network is visible in the report), or to a more optimal network among competing roaming/visited networks when the home network is not visible. The UE, for example, may be programmed to execute one or more of the processing steps discussed above. In some embodiments, the home network provider may cause an application to be installed on the user device (e.g., in a memory thereof) to enable a processor of the UE to execute the application for the UE to initiate handovers.

In this scenario, the neighboring eNB having the highest priority PLMN is enabled to, upon receiving the UE measurement report, validate when the UE measurement report indicates the received signal strength level to be higher than a threshold configured on the non-serving neighbor eNB. When so validated, the non-serving eNB may be further enabled to request that the source eNB, e.g., by way of an S1 link, trigger a "handover required" message. Accordingly, roaming networks having higher priority PLMNs may also be provided some level of control over the UE mobility without relying on mobility parameter settings and triggers set on roaming or visitor networks having lower priority PLMN, which is beneficial to the subscribed UE when its own home network is not available.

Exemplary embodiments of systems and methods for home network-initiated and UE-initiated handovers are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized in connection with other managed communication networks.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a DSP device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

The invention claimed is:

1. A method of initiating a handover, to a non-serving first wireless communication network, of a wireless electronic user device subscribed to the first wireless communication network but connected to a serving second wireless communication network to which the user device is not subscribed, the method comprising the steps of:
   obtaining a device measurement report from the user device;
   analyzing, by a first processor associated with the non-serving first wireless communication network and separate from the serving second wireless communication network, the obtained measurement report to detect (i) a visibility of the non-serving first wireless communication network in the measurement report, and (ii) a received signal strength of the serving second wireless communication network is higher than a received signal strength of the non-serving first wireless communication network;

determining, from the detected visibility, an availability to handover the user device from the serving second wireless communication network to the non-serving first wireless communication network; and transmitting a handover command to the serving second wireless communication network based on the step of determining by the processor of the non-serving first wireless network, wherein the detected visibility enables the non-serving first wireless network to retain handover control of the wireless electronic user device from the serving second wireless communication network reporting higher signal strength that the non-serving first wireless communication network;

wherein the wireless electronic user device is a user equipment device (UE);

wherein the UE is a dual-subscriber identification module (SIM) device having a first SIM and a second SIM;

wherein (i) the first SIM is wirelessly connected to the first wireless communication network, (11) the second SIM is simultaneously wirelessly connected to the second wireless communication network, and (iii) the handover command causes the second wireless communication network to release the second SIM to the first wireless communication network.

2. The method of claim 1, wherein the device measurement report is a UE measurement report.

3. The method of claim 2, wherein the UE measurement report is transmitted periodically.

4. The method of claim 2, wherein the UE measurement report includes location information of the UE.

5. The method of claim 2, wherein the step of determining is based at least in part on the location information.

6. The method claim 2, wherein first communications network includes a first communications node.

7. The method of claim 6, wherein the first communications node wirelessly obtains the UE measurement report directly from the UE.

8. The method of claim 6, wherein the first communications node obtains the UE measurement report indirectly over a roaming interface enabling operable communication between the first wireless communication network and the second wireless communications network.

9. The method of claim 8, wherein the roaming interface is an S10 interface.

10. The method of claim 6, wherein the first communications node includes at least one of a cellular base station, a small cell, a radio access network (RAN), an eNB, and a gNB.

11. The method of claim 6, wherein the first communications network includes a first core network portion in operable communication with the first communications node.

12. The method of claim 11, wherein the first core network portion includes at least one of a mobile core and an evolved packet core (EPC).

13. The method of claim 11, wherein the first core network portion includes a first mobility management entity (MME) and one or more of a first packet data network gateway (PGW), a first serving gateway (SGW), a first policy control and charging rules function (PCRF) unit, and a first home subscriber server (HSS).

14. The method of claim 13, wherein the first processor is disposed within the first communications node.

15. The method claim 14, wherein the step of transmitting the handover command is initiated by the first MME of the first wireless communication network.

16. The method claim 14, wherein the UE is subscribed to the second first wireless communications network as a home network of the UE.

17. The method of claim 1, wherein the first processor is disposed within the UE.

* * * * *